US012753268B2

(12) United States Patent
Cao et al.

(10) Patent No.: US 12,753,268 B2
(45) Date of Patent: Oct. 6, 2026

(54) THERMOPLASTIC POLYURETHANE BASED POLYMERIC ELECTROLYTE COMPOSITION

(71) Applicant: Huntsman International LLC, The Woodlands, TX (US)

(72) Inventors: Lan Cao, Derry, NH (US); Zarif Farhana Mohd Aris, Derry, NH (US)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 639 days.

(21) Appl. No.: 18/022,235

(22) PCT Filed: Aug. 19, 2021

(86) PCT No.: PCT/US2021/046594
§ 371 (c)(1),
(2) Date: Feb. 20, 2023

(87) PCT Pub. No.: WO2022/040373
PCT Pub. Date: Feb. 24, 2022

(65) Prior Publication Data

US 2023/0295369 A1 Sep. 21, 2023

Related U.S. Application Data

(60) Provisional application No. 63/067,956, filed on Aug. 20, 2020.

(51) Int. Cl.

| | |
|---|---|
| ***C08G 18/48*** | (2006.01) |
| ***C08G 18/42*** | (2006.01) |
| ***C08G 18/75*** | (2006.01) |
| ***C08K 3/08*** | (2006.01) |
| ***C08K 5/109*** | (2006.01) |
| ***H01M 10/0565*** | (2010.01) |

(52) U.S. Cl.
CPC ..... *C08G 18/4825* (2013.01); *C08G 18/4238* (2013.01); *C08G 18/753* (2013.01); *C08K 3/08* (2013.01); *C08K 5/109* (2013.01); *C08K 2003/0818* (2013.01); *H01M 10/0565* (2013.01); *H01M 2300/0082* (2013.01)

(58) Field of Classification Search
CPC .......... G02F 1/15165; H01M 10/0565; H01M 10/0568; H01M 10/0569; H01M 2300/0085
See application file for complete search history.

(56) References Cited

U.S. PATENT DOCUMENTS

| | | | | |
|---|---|---|---|---|
| 6,361,709 | B1 * | 3/2002 | Bauer | G02F 1/1525 359/275 |
| 8,115,984 | B2 | 2/2012 | Agrawal et al. | |
| 2002/0102464 | A1 | 8/2002 | Yoshida et al. | |
| 2008/0310007 | A1 | 12/2008 | Agrawal et al. | |
| 2016/0091767 | A1 * | 3/2016 | Agrawal | G02F 1/161 359/267 |
| 2019/0145161 | A1 * | 5/2019 | Agrawal | E06B 9/24 359/275 |
| 2020/0017649 | A1 | 1/2020 | Agrawal et al. | |
| 2020/0019033 | A1 * | 1/2020 | Agrawal | B32B 17/10513 |

FOREIGN PATENT DOCUMENTS

| | | | |
|---|---|---|---|
| WO | 2018009645 | A1 | 1/2018 |
| WO | 2018128906 | A1 | 7/2018 |

OTHER PUBLICATIONS

Patent Cooperation Treaty International Search Report and Written Opinion pertaining to International Application No. PCT/US2021/046594; International Filing Date: Aug. 19, 2021; Date of Mailing: Nov. 9, 2021.
Wang, Guojian, Multicomponent Polymers—Principles, Structures and Properties, Tongji University Press, Oct. 31, 2013, p. 273.
Liu, Fengtian, The World Brands Collection of Raw Plastic Materials, Huanghe Publishing House, Jun. 2007, Sections I and II of Chapter 7, pp. 651-652.

* cited by examiner

*Primary Examiner* — Christopher M Rodd

(57) ABSTRACT

The present disclosure relates to a thermoplastic polyurethane (TPU) based polymer electrolyte composition hosting an ion conductive salt in the presence of a plasticizer.

17 Claims, No Drawings

THERMOPLASTIC POLYURETHANE BASED POLYMERIC ELECTROLYTE COMPOSITION

CROSS-REFERENCE TO RELATED APPLICATIONS

This application is a National Phase of International Application No. PCT/US2021/046594 filed Aug. 19, 2021, which designates the U.S. and claims priority to U.S. Provisional Application No. 63/067,956 filed on Aug. 20, 2020. The noted applications are incorporated herein by reference in their entirety.

BACKGROUND

Field

The present disclosure relates to a polymeric electrolyte composition comprising an ion conductive salt.

Background Information

Polymeric electrolyte compositions are known as "ionic conductive polymers" and can show ionic conductivity depending on the type of phase present in their structures. For example, in comparison to polymers with crystalline phases, polymers with amorphous phases often exhibit better ion conductivity.

Ionic conductive polymers, such as polymeric solid electrolytes, are often used in fuel cells, secondary cells, and electrochemical sensors systems because of their ionic conductivity.

U.S. Pat. No. 6,361,709 discloses a polymeric solid electrolyte, which comprises polyacrylates. In this case, solid electrolytes are prepared by dissolving the starting materials in suitable organic solvents, coating the glass substrate and evaporating the solvent. The use of these types of solid electrolytes is expensive and inconvenient (e.g., long drying times are needed).

Ionic conductive polymers can also be used in other applications, such as in electrochromic systems or displays, where certain mechanical, electrical conductivity, and optical properties are desired over a prolonged time period.

However, ionic conductive polymers that are utilized in battery applications are not suitable for use in in electrochromic glazing systems due to the different optical requirements that are needed for glazing systems. For example, the ionic conductive polymers used in battery applications have high haze and are limited to aprotic solvent. These properties make them inadequate for use as an electrolyte ion conductive layer in electrochromic devices.

In other words, depending on the application the polymeric electrolyte composition will be different.

Generally, electrochromic devices are composed of several layers, such as at least a conductive substrate layer (e.g., ITO coated glass), a dye-containing active layer and an ion-conducting layer. It is known that ion-conducting layer can be a polymer in glazing systems (e.g., WO 2018/009645 and WO 2018/128906).

Currently, ion-conductive layers in electrochromic devices can be made of fluorine-containing polymer or poly(vinyl formal) (e.g., U.S. Pat. No. 8,115,984).

Fluoropolymers do not have good adhesion to the substrate and tend to cause high haze in electrochromic device, due to refractive index mismatch with the other layers constituting the electrochromic device.

Although poly(vinyl formal) is commonly used in safety glazing application due to its lower cost, it does not bond well to other polymer layers and it is sensitive to moisture, which may require more stringent processing condition during mass production.

There is, therefore, a need to provide a polymeric electrolyte composition that can be used as ion-conductive layer in several fields of applications, such as in electrochromic devices, batteries, displays, electronic systems, electrochemical sensors, electrochromic glazing systems. The composition should provide optical transparency in the visible spectral region, appropriate ionic conductivity, good mechanical properties, and sufficient adhesion between layers when used as part of a multi-layer system, such as in an electrochromic device.

DETAILED DESCRIPTION

It is an object of the present disclosure to overcome the aforementioned drawbacks by providing a polymeric electrolyte composition comprising optical transparency in the visible spectral region, ionic conductivity, and certain mechanical properties (e.g., adhesion and Tg) when used as an ion-conductive layer in an electrochromic device or in any other multi-layer structure.

The present disclosure provides a thermoplastic polyurethane (TPU) based polymeric electrolyte composition comprising an ion conductive salt in the presence of a plasticizer which when made into a film (e.g., through extrusion, moulding, spin coating, dip coating, or solution casting) has a peel strength to glass of between 3-25 N/mm as measured according to ASTM D 3167. In certain embodiments, the ion conductive salt is present in dissociated form and contains ions selected from the group consisting of $Li^+$, $Na^+$, $K^+$, $Cl^-$, $ClO_4^-$, $BF_4^-$, $PF_6^-$, $CF_3SO_3^-$, $N(CF_3SO_2)^{2-}$, and mixtures thereof.

In addition to the peel strength described above, the TPU-based polymeric electrolyte composition of the present disclosure has a Tg lower than −30 (e.g., lower than −40° C. or lower than −50° C.) as measured according to ASTM D5026, a tensile strength between 5 and 25 MPa as measured according to ASTM D412, and/or an ionic conductivity of at least $10^{-5}$ S/cm at ambient temperature (e.g., 23° C.) as measured by electrochemical impedance spectroscopy.

Advantageously, the TPU-based polymeric electrolyte composition of the present disclosure is predominantly solid and the remaining part (for instance at least 15 wt % based on the total weight of the composition) is liquid.

Moreover, unlike other ionic conductive polymers, TPU technology is used in the present disclosure for providing the polymeric electrolyte material. It has been surprisingly found that the TPU based electrolyte composition disclosed herein has several advantages in terms of mechanical strength, optical transparency (e.g., higher than 80% light transmission when laminated between glass and/or less than 2% haze, measured according to ASTM D1003), adhesion properties, and ionic conductivity ability (preferably, at least higher than $10^{-5}$ S/cm at ambient temperature, preferably 23° C.).

Advantageously, the TPU-based polymeric electrolyte composition of the present disclosure has both hard and soft segments.

The hard segment of the TPU-based polymeric electrolyte composition comprises an isocyanate-containing compound (e.g., an aliphatic isocyanate-containing compound). Suitable aliphatic isocyanate-containing compounds that may be used include 4,4'-methylene dicyclohexyl diisocyanate (H12MDI), isocyanatomethyl-1,8-octane diisocyanate, 1,4-cyclohexanediisocyanate (CDI), hexamethylene diisocyanate (HDI), isophorone diisocyanate (IPDI), and mixtures thereof. Additional isocyanate-containing compounds that may be used in connection with the composition disclosed herein also include the compounds described in the "Isocyanate-containing Compound" section below.

The soft segment of the TPU-based polymeric electrolyte composition comprises an isocyanate-reactive compound (e.g., a polyether polyol containing compound). In certain embodiments, the polyether polyol containing compound is selected from the group consisting of poly(tetramethylene ether glycol) (PTMEG), poly(ethylene glycol), poly(propylene glycol), and mixtures thereof. Additional isocyanate-reactive compounds that may be used in connection with the composition disclosed herein also include the compounds described in the "Isocyanate-Reactive Compound" section below.

In one embodiment, the aliphatic isocyanate-containing compound also contains a chain extender having a molecular weight between 50 and 150 (e.g., 60 and 120).

Suitable chain extenders that may be used in the disclosed composition include ethylene glycol, diethylene glycol, 1,3-propylene glycol, 1,4-butylene glycol, 1,3-butylene glycol, 1,5-pentamethylene glycol, 1,6-hexamethylene glycol, neopentyl glycol, 2-methyl-1,3-propanediol, 3-methyl-1,5-pentanediol and mixtures thereof.

As described above, the TPU-based polymeric electrolyte composition of the present disclosure also comprises a plasticizer. The plasticizer acts as a solvent and enables solvating the ion from the conductive salt and promoting ion movement. Unlike polymeric solid electrolytes that contain no liquid, in certain embodiments, the electrolyte composition disclosed herein can comprise some liquid. This means that the plasticizer does not need to be evaporated completely from the composition.

Plasticizers function on the one hand as solvents for the conductive salts and furthermore affect the mechanical properties of the polymeric electrolyte. Suitable plasticizers that may be used are described in the "Plasticizers" section below.

Isocyanate-Containing Compound

Suitable isocyanate-containing compound that can be used in the TPU-based polymeric electrolyte composition can comprise aromatic, araliphatic, or aliphatic organic isocyanates. Suitable aromatic isocyanates include also polyisocyanates. In this case, the chain extenders mentioned in the present application can also be used in combination with such isocyanate-containing compound.

Suitable polyisocyanates comprise polyisocyanates of the type Ra—(NCO)x, with x being at least 2 and Ra being an aromatic such as diphenylmethane, or toluene, or a similar polyisocyanate.

Non-limiting examples of suitable aromatic polyisocyanate monomers that can be used in the present disclosure can be any polyisocyanate compound or mixture of polyisocyanate compounds, preferably wherein said compound(s) comprise(s) preferably at least two isocyanate groups.

Non-limiting examples of suitable aromatic polyisocyanate monomers include diisocyanates, particularly aromatic diisocyanates, and isocyanates of higher functionality. Non-limiting examples of aromatic polyisocyanate monomers which may be used in the present disclosure include aromatic isocyanate monomers such as diphenylmethane diisocyanate (MDI) in the form of its 2,4', 2,2' and 4,4' isomers and mixtures thereof (also referred to as pure MDI), the mixtures of diphenylmethane diisocyanates (MDI) and oligomers thereof (known in the art as "crude" or polymeric MDI), m- and p-phenylene diisocyanate, tolylene-2,4- and tolylene-2,6-diisocyanate (also known as toluene diisocyanate, and referred to as TDI, such as 2,4 TDI and 2,6 TDI) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; tetramethylxylene diisocyanate (TMXDI), and tolidine diisocyanate (TODD; any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g., polyisocyanates as set out above, and preferably MDI-based polyisocyanates). Preferably diphenylmethane diisocyanate (MDI) or toluene diisocyanates (TDI)-type isocyanates are used.

In some embodiments, the aromatic isocyanate monomer comprises a polymeric methylene diphenyl diisocyanate. The polymeric methylene diphenyl diisocyanate can comprise any mixture of pure MDI (2,4', 2,2' and 4,4' methylene diphenyl diisocyanate) and higher homologues of formula (X):

(X)

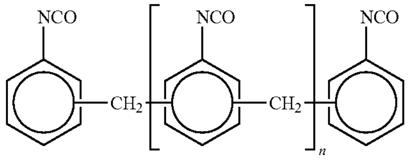

wherein n is an integer which can be from 1 to 10 or higher, preferably does not exclude branched version thereof.

Preferably, the aromatic isocyanate monomer comprises diphenylmethane diisocyanate (MDI), polymeric forms thereof, and/or variants thereof (such as uretonimine-modified MDI). In a particular aspect of the present disclosure, said isocyanate-containing compound can be an aliphatic isocyanate-containing compound, preferably selected from the list consisting of 4,4'-methylene dicyclohexyl diisocyanate (H12MDI), isocyanatomethyl-1,8-octane diisocyanate, 1,4-cyclohexanediisocyanate (CDI), hexamethylene diisocyanate (HDI), isophorone diisocyanate (IPDI) and mixtures thereof.

Isocyanate-Reactive Compound

The isocyanate-reactive compound used in the TPU-based polymeric electrolyte composition may comprise a component that contains isocyanate-reactive groups. As used herein, the term "isocyanate-reactive groups" refers to chemical groups susceptible to electrophilic attack by an isocyanate group.

Non-limiting examples of such groups include OH groups. In some embodiments, the isocyanate-reactive compound comprises at least one OH group. Examples of suitable isocyanate-reactive compounds containing isocyanate-reactive OH atoms include polyols (e.g., glycols, polyether polyols, and polyester polyols), carboxylic acids (e.g., polybasic acids), and mixtures thereof.

In certain embodiments, the isocyanate-reactive compound used in the disclosed composition has a number average molecular weight equal to or higher than 400 g/mol. For example, a polyol, such as a polyether or polyester polyol, having a molecular weight (MW), of at least 500 to at most 20000 g/mol (e.g., 600 to at most 10000 g/mol, 1000 to 8000 g/mol, 2000 to 6000 g/mol, or 2000 to at most 4000 g/mol) may be used as the isocyanate-reactive compound.

A polyester polyol can be produced by: (1) an esterification reaction of one or more glycols with one or more dicarboxylic acids or anhydrides, or (2) by transesterification reaction (i.e., the reaction of one or more glycols with esters of dicarboxylic acids). Mole ratios generally in excess of more than one mole of glycol to acid are preferred to obtain linear chains having a preponderance of terminal hydroxyl groups. Suitable polyesters also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-Butanediol is the preferred glycol.

In certain embodiments, the polyester polyol is based on the reaction product of 1,4-butanediol and adipic acid.

In some embodiments, the isocyanate-reactive compound can be reacted with at least one isocyanate, along with extender glycol. Non-limiting examples of suitable extender glycols (i.e., chain extenders) include lower aliphatic or short chain glycols having from about 2 to about 10 carbon atoms and include, for instance, ethylene glycol, diethylene glycol, butylene glycol, propylene glycol, dipropylene glycol, 1,2-propoylene glycol, 1,3-propylene glycol, 1,4-butylene glycol, 1,3-butylene glycol, 1,5-pentamethylene glycol, 1,6-hexamethylene glycol, neopentyl glycol, 2-methyl-1,3-propanediol, 3-methyl-1,5-pentanediol, 1,4-cyclohexanedimethanol, hydroquinone di(hydroxyethyl)ether, and mixtures thereof.

A polyether polyol can be obtained by the polymerization of alkylene oxide (e.g., ethylene oxide, propylene oxide, butylene oxide or tetrahydrofuran) in the presence of polyfunctional initiators wherein the initiator generally comprises from 2 to 8 active hydrogen atoms per molecule. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenylene diamine, diphenylmethane diamine, ethylene diamine, cyclohexane diamine, cyclohexane dimethanol, resorcinol, bisphenyl A, glycerol, trimethylolpropane, 1,2,6-hexanetriol, pentaerythritol, sorbitol and sucrose. Mixtures of initiators and/or cyclic oxide may be used. Of particularly useful and preferred polyether polyols include polytetramethylene ether glycol (PTMEG) obtained by the polymerization of tetrahydrofuran (THF).

PTMEG, also called polyTHF, is manufactured by the cationic polymerization of THF. The five-membered THF ring is more stable than the three-membered rings of ethylene oxide or propylene oxide and can only be polymerized using acid catalyst, such as fluorosulfonic acid. At the completion of polymerization, the resulting polymer is hydrolyzed to have hydroxyl end groups. PTMEG is available commercially as Terathane® from Invista, Polymeg® from Lyondell and PolyTHF® from BASF with typical molecular weight in the range of 650 to 3000. PTMEG is a premium polyether polyol for polyurethane elastomers application that offers the benefits of excellent hydrolysis and microbial resistance compared to polyester polyol, excellent resilience and high elasticity at low temperature.

Suitable hydroxyl terminated polyethers are preferably polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and are thus preferred. Useful commercial polyether polyols include poly(ethylene glycol) comprising ethylene oxide reacted with ethylene glycol, poly(propylene glycol) comprising propylene oxide reacted with propylene glycol, poly(tetramethylglycol) (PTMG) comprising water reacted with tetrahydrofuran (THF). Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the composition disclosed herein. Typical copolyethers include the reaction product of glycerol and ethylene oxide or glycerol and propylene oxide.

In certain embodiments, the number average molecular weight of polyether polyol is preferably between 500 and 5000 (e.g., 500-3000, 600-2500).

Plasticizers

In certain embodiments, the plasticizer is selected from the group consisting of propylene carbonate, ethylene carbonate, methyl ethyl carbonate, dibutyl carbonate, triglyme, tetraglyme, γ-butyrolactone, sulfolane, and mixtures thereof. Other suitable plasticizers that may be used in the composition include conventional high-boiling plasticizers or those plasticizers in which the ions, such as Li ions, can be solvated.

In some embodiments, protic and aprotic plasticizers are used in the composition. Examples of protic plasticizers are glycol and oligomeric polyethylene glycols or polypropylene glycols which have terminal OH groups. It is also possible to employ primary alcohols, for example 2-ethylhexanol.

Examples of aprotic plasticizers are linear or cyclic organic carbonates of the general formula $R_1O(CO)OR_2$, where $R_1$ and $R_2$ are each straight-chain or branched alkyl radicals or aryl radicals, which may also carry inert substituents, for example chlorine or bromine. Particularly suitable are carbonates having 1 to 6 carbon atoms. $R_1$ and $R_2$ can also be linked to one another to form a, for example, 5- or 6-membered ring. It is also possible for carbon atoms to be substituted by O. Examples of carbonates of this type are ethylenecarbonate, propylenecarbonate, butylenecarbonate, diethylcarbonate, dipropylcarbonate, diisopropylcarbonate, dibutylcarbonate, di(2-methoxyethyl)carbonate and di(2-butoxyethyl)carbonate. Also suitable are organic phosphates $R_1R_2R_3PO_4$, where $R_1$, $R_2$ and $R_3$ are each straight-chain or branched alkyl radicals having 1 to 8 carbon atoms or aryl radicals, which may also be further substituted. In particular, carbon atoms can also be substituted by O. $R_1$, $R_2$ and $R_3$ can also be bonded to one another in pairs to form a ring. Examples of suitable phosphates are trimethyl phosphate, triethyl phosphate, tripropyl phosphate, tributyl phosphate, triisobutyl phosphate, tripentyl phosphate, trihexyl phosphate, trioctyl phosphate, tris(2-ethylhexyl)phosphate, tridecyl phosphate, diethyl n-butyl phosphate, tris(butoxyethyl)phosphate, tris(2-methoxyethyl) phosphate, tris(tetrahydrofuryl)phosphate, tris(1H, 1H, 5H-octafluoropentyl) phosphate, tris(1H, 1H-trifluoroethyl)phosphate, tris(2-(diethylamino)ethyl)phosphate, tris(methoxyethoxyethyl) phosphate, tris(ethoxycarbonyloxyethyl)phosphate and tricresyl phosphate.

Other suitable plasticizers include esters of organic acids such as esters of adipic acid or phthalic acid (e.g., 2-ethylhexyl adipate or 2-ethylhexyl phthalate). It may be advantageous to use cyclic esters, such as [omega]-butyrolactone, dimethyl-[omega]-butyrolactone, diethyl-[omega]-butyrolactone, [omega]-valerolactone, 4,5-dimethyl-1,3-dioxolan-2-one, 4,4-dimethyl-1,3-dioxolan-2-one, 4-ethyl-1,3-dioxolan-2-one, 4-methyl-5-ethyl-1,3-dioxolan-2-one, 4,5-diethyl-1,3-dioxolan-2-one, 4,4-diethyl-1,3-dioxolan-2-one, 1,3-dioxan-2-one, 4-methyl-1,3-dioxan-2-one, 5-methyl-1,3-dioxan-2-one, 4,4-dimethyl-1,3-dioxan-2-one, 5,5-dimethyl-1,3-dioxan-2-one, 4,6-dimethyl-1,3-dioxan-2-one or 4,4,6-trimethyl-1,3-dioxan-2-one, and 5,5-diethyl-1,3-dioxan-2-one. It may also be advantageous to use esters of inorganic acids containing $—(CH_2—CH_2O)_nCH_3$ groups (e.g., esters of boric acid, carbonic acid, sulfuric acid and phosphoric acid). It is also possible to employ ethers, for example dibutyl ether, dihexyl ether, diheptyl ether, dioctyl ether, dinonyl ether, didecyl ether, didodecyl ether, ethylene glycol dimethyl ether, ethylene glycol diethyl ether, 1,2-dimethoxypropane, diethylene glycol dibutyl ether, triethylene glycol dimethyl ether, tetraethylene glycol dimethyl ether or polyglycol alkyl ethers, -tetrahydropyran, 1,4-dioxane, 1,3-dioxane, 2,5-diethoxytetrahydrofuran or 2,5-dimethoxytetrahydrofuran. Also suitable are dimethylformamide, N-methylpyrrolidone and acetonitrile. It is also possible for mixtures of any of the plasticizers disclosed herein to be present in the disclosed TPU-based polymeric electrolyte composition.

In a preferred embodiment, said plasticizer is present in an amount comprised between 5 and 40 wt % (e.g., between 5 and 32 wt %, 5 and 30 wt %, or 5 and 28 wt %) based on the total weight of said composition.

Other Additives

The composition of the present disclosure can also include additives, such as Irganox, Irgafos antioxidants (AO) and Tinuvin, Uvinul UV stabilizers all from BASF. The total amount of the additives is typically less than 2 wt % of the final composition.

Method of Making the TPU-Based Polymeric Electrolyte Composition

The present disclosure is also directed to a method for making a TPU-based polymeric electrolyte composition comprising an ion conductive salt which when made into a film has a peel strength to glass comprising between 3-25 N/mm as measured according to ASTM D 3167, wherein the method comprises:

a. mixing an isocyanate-reactive compound with a chain extender with formation of a mixture;
b. dissolving an ion conductive salt in a plasticizer to form a plasticizer loaded with the salt;
c. mixing the plasticizer loaded with the salt with the mixture;
d. adding the obtained mixture of step c to an isocyanate-containing compound leading to the formation of the TPU based polymeric electrolyte composition.

In certain embodiments, a method of making a TPU-based polymeric electrolyte composition, wherein the method comprises:

a. mixing an isocyanate-reactive compound with a chain extender to form a mixture;
b. dissolving an ion conductive salt in a plasticizer to form a plasticizer loaded with the salt;
c. mixing the plasticizer loaded with the salt with the mixture to form an isocyanate-reactive mixture; and
d. adding the isocyanate-reactive mixture to an isocyanate-containing compound and forming the TPU based polymeric electrolyte composition.

Thermoplastic polyurethane is preferably obtained by mixing (without being limited by the following order) an isocyanate-containing compound, isocyanate-reactive compound and a chain extender.

In addition, the composition disclosed herein can also comprise (e.g., be doped) with ion conductive salt.

In the composition of the present disclosure, isocyanate-containing compound, isocyanate-reactive compound and chain extender can be present in an amount comprised between 60-80 wt %, based on the total weight of the composition (including the weight of plasticizer and ion-conductive salt).

Plasticizer and lithium salt can be present in an amount of between 20-40 wt %, based on the total weight of the composition (see above, all aforementioned compounds).

Ion-conductive salt, preferably lithium salt, such as lithium bis(trifluoromethanesulfon)imide), can be present in an amount of between 0.05-3 wt %, based on the total weight of the composition.

In a preferred embodiment, isocyanate-containing compound is H12MDI, isocyanate-reactive compound is polyether polyol, such as PTMEG, and the chain extender is glycol based.

The composition of the present disclosure is TPU based, which means that it has hard and soft segment, and wherein the molar ratio between said aliphatic isocyanate-containing compound and the chain extender is comprised between 1 and 2.

The molar ratio between isocyanate-containing compound and said isocyanate-reactive compound is comprised between 1 and 10.

In certain embodiments, the composition is cured and then processed into one or more granules (e.g., via a grinding process) that can be extruded into the film and used in various applications as described below.

Use of TPU-Based Polymeric Electrolyte Composition

In certain embodiments, the TPU-based polymeric electrolyte composition is suitable for use in electrochromic devices where optically transparent and conductive properties are needed. In yet other embodiments, the composition can also be used in other fields of applications, such as displays or when used as a one-layer system (e.g., a stand-alone film). In other words, the TPU-based polymeric electrolyte composition can be used in any application where it can play the role of an ion-conductive layer or film.

Accordingly, in some embodiments, the TPU-based polymeric electrolyte composition of the present disclosure can be used in electrochromic devices. In this case, the composition can be provided as a film that will act as one optically transparent and ion conductive layer in the electrochromic device.

In other embodiments, the TPU-based polymeric electrolyte composition can form a part of a multi-layer system. The multi-layer comprises at least one first conductive substrate layer and at least one second conductive substrate layer, wherein an optically transparent ion conductive layer made of the TPU-based polymeric electrolyte composition is sandwiched between said at least one and second conductive substrate layer. For example, the TPU-based polymeric electrolyte composition can be used as a film that is sandwiched between at least 2 glass layers.

In some embodiments, the thermoplastic polyurethane (TPU) based polymeric electrolyte composition can be used to manufacture transparent glazing. In this embodiment, the inventors discovered that a combination of properties lead to a final product having several advantages when compared to products known in the industry. In particular, it has been observed that the thermoplastic polyurethane (TPU) based polymeric electrolyte composition when made into a film that is used in a glazing system has:

- a peel strength to glass comprised between 3-25 N/mm, measured according to ASTM D 3167;
- an ionic conductivity of at least $10^{-5}$ S/cm at ambient temperature (e.g., 23° C.), measured by electrochemical impedance spectroscopy;
- a tensile strength between 5 and 25 MPa, measured according to ASTM D 412;
- less than 5% haze (e.g., less than 2% haze, less 1% haze) when measured according to ASTM D1003; and
- a Tg lower than −30 (e.g., lower than −40° C., lower than −50° C.) when measured according to ASTM D5026.

Such glazing system may be used for smart windows in architectural and transportation applications. They may also be used in other applications such as smart glass, electronic displays, wearables.

The TPU-based polymeric electrolyte composition disclosed herein can be in connection with the manufacture of an electrochromic device such as those described in PCT Publication Nos. WO 2018/009645 and WO 2018/128906, which are incorporated by reference in the present disclosure.

According to a particular embodiment of the present disclosure, an electrochromic device is provided and comprises consecutively a first glass layer, a first transparent conductor, optionally a $WO_3$ layer, an electrolyte film made of the composition disclosed herein, an active electrolyte coating, a second transparent conductor and a second glass layer.

Miscellaneous

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the disclosure, and form different embodiments, as would be understood by those in the art. For example, in the appended claims, any of the claimed embodiments can be used in any combination.

As used herein, the singular forms "a", "an", and "the" include both singular and plural referents unless the context clearly dictates otherwise. By way of example, "an isocyanate compound" means one isocyanate group or more than one isocyanate group.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of". This means that, preferably, the aforementioned terms, such as "comprising", "comprises", "comprised of", "containing", "contains", "contained of", can be replaced by "consisting", "consisting of", "consists".

Throughout this application, the term "about" is used to indicate that a value includes the standard deviation of error for the device or method being employed to determine the value.

As used herein, the terms "% by weight", "wt %", "weight percentage", or "percentage by weight" are used interchangeably.

The recitation of numerical ranges by endpoints includes all integer numbers and, where appropriate, fractions subsumed within that range (e.g., 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g., from 1.0 to 5.0 includes both 1.0 and 5.0). Any numerical range recited herein is intended to include all sub-ranges subsumed therein.

Unless specified otherwise, molecular weight is determined by assay of terminal functional groups and is related to the number average molecular weight.

The average molecular weight is typically determined by gel permeation chromatography while the equivalent weight can be derived from a titrated hydroxyl number, as is appreciated in the art.

In the present disclosure, the OH value (also referred as OH number or OH content) can be measured according to ASTM D1957 standard and is expressed in mg KOH/g.

The hydroxyl value, sometimes called the hydroxyl number, is defined as the number of milligrams of potassium hydroxide required to neutralize the acetic acid taken up on acetylation of one gram of a chemical substance that contains free hydroxyl groups. The method involves acetylation of the free hydroxyl groups of the substance with acetic anhydride in pyridine solvent. After completion of the reaction, water is added, and the remaining unreacted acetic anhydride is converted to acetic acid and measured by titration with potassium hydroxide. The unit for OH value is expressed in mg KOH/g polyol. OHv=(56.1 g/mol KOH×polyol functionality×1000)/(molecular weight).

All references cited in the present specification are hereby incorporated by reference in their entirety. In particular, the teachings of all references herein specifically referred to are incorporated by reference.

Unless otherwise defined, all terms used in the present disclosure, including technical and scientific terms, have the meaning as commonly understood by one of ordinary skill in the art to which this disclosure belongs. By means of further guidance, term definitions are included to better appreciate the teaching of the present disclosure.

Throughout this application, different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Although the preferred embodiments of the disclosure have been disclosed for illustrative purpose, those skilled in the art will appreciate that various modifications, additions or substitutions are possible, without departing from the scope and spirit of the disclosure as disclosed in the accompanying claims.

EXAMPLES

Thermoplastic polyurethanes (TPU) described in this disclosure were synthesized through a batch process using H12MDI as the diisocyanate, PTMEG or butanediol adipate (BD-AA) polyester as the polyol and low molecular weight glycol (e.g 1,4-butanediol, ethylene glycol) as the chain extender. TPU also contains common additives, such as antioxidant (AO) and UV stabilizer. Lithium salt was dissolved in the plasticizer (propylene carbonate) prior to the reaction. Polyol, chain extender, plasticizer (with lithium salt) and additives were charged into a reaction vessel and mixed. Diisocyanate (H12MDI) was then added under agitation. After the reaction mixture reached 100° C., it was poured into a Teflon lined mold and cured at 23° C. for 2 days. After curing, the product was further processed into granules and extruded into film for physical property testing.

Glass laminate was prepared in an autoclave by placing TPU film between two 3 mm clean glass for haze and light transmission testing or by placing TPU directly on one piece of 6 mm clean glass for peel strength testing. Haze and light transmission of laminated glass were measured according to ASTM D1003 using a Haze-gard Plus machine from BYK Peel strength of TPU to glass was measured according to ASTM D3167 using an Instron machine. Tensile properties of the film were measured according to ASTM D412 using an Instron tensile tester. Hardness was measured according to ASTM D2240 by stacking several layers of the film together. The glass transition temperature (Tg) of the film was measured using a Q800 dynamic mechanical analyzer from TA Instruments in tension mode according to ASTM D5026. The Tg was taken from the peak maximum of the loss modulus curve. The ionic conductivity was measured by electrochemical impedance spectroscopy using film sandwiched between two gold electrodes. The impedance analyzer was supplied by Bio-Logic USA with a controlled environment sample holder.

Results

Table 1 below illustrates several embodiments. Examples 1 and 2 differ from each other in the hardness of the film and the loading of lithium salt. It can be seen from table 1 below that all compositions maintain low haze and good mechanical properties. The conductivity of the film also reaches desirable range for electrochromic devices. A balance of optical transparency, good mechanical properties and desirable ionic conductivity can be achieved by adjusting electrolyte film composition.

Example 4 indicates Tg value of the composition, when plasticizer and salt are not part of the composition.

TABLE 1

| Electrolyte Film | Ex. 1 | Ex. 2 | Ex. 3 | Ex. 4 |
|---|---|---|---|---|
| Composition, wt % | | | | |
| H12MDI | 42.14 | 36.01 | 28.37 | 37.33 |
| PTMEG Polyol | 25.69 | 34.34 | 0 | 54.22 |
| BD-AA Polyester Polyol | 0 | 0 | 22.36 | 0 |
| Chain Extender | 10.53 | 8.0 | 7.63 | 6.8 |
| Additives, e.g., AO, UV | 1.64 | 1.64 | 1.64 | 1.64 |
| Plasticizer | 19.04 | 17.61 | 38.09 | 0 |
| Li Salt | 0.96 | 2.39 | 1.91 | 0 |
| Glass Laminate Properties | | | | |
| Haze (%) | 0.8 | 1.0 | 4.5 | 1.0 |
| Light Transmission (%) | 90 | 90 | 89 | 89 |
| Peel Strength (N/mm) | 10.9 | 8.8 | 5.9 | 17.5 |
| Film Properties | | | | |
| Tensile Strength (MPa) | 20.7 | 14.1 | 5.2 | 48.2 |
| Elongation at Break (%) | 330 | 470 | 320 | 370 |
| Tensile Stress at 100% Strain (MPa) | 7.2 | 3.7 | 4.5 | 3.4 |
| Tensile Stress at 300% Strain (MPa) | 19.2 | 7.7 | 5.2 | 16.2 |
| Hardness, shore A | 82 | 69 | 77 | 75 |
| Tg (° C.) | −55.3 | −59.0 | −54.2 | −51.3 |
| Ionic Conductivity (S/cm) | $1.40E^{-07}$ | $1.70E^{-06}$ | $4.70E^{-05}$ | Not applicable |

The invention claimed is:

1. A thermoplastic polyurethane (TPU) based polymeric electrolyte composition comprising an ion conductive salt in the presence of a plasticizer which when made into a film has a peel strength to glass comprising between 3-25 N/mm as measured according to ASTM D 3167, wherein the composition comprises hard and soft segments, wherein the hard segment contains an aliphatic isocyanate-containing compound and a chain extender, and wherein a molar ratio between the aliphatic isocyanate-containing compound and the chain extender is from 1 to 1.5.

2. The composition according to claim 1, wherein the aliphatic isocyanate-containing compound is selected from the group consisting of 4,4'-methylene dicyclohexyl diisocyanate (H12MDI), isocyanatomethyl-1,8-octane diisocyanate, 1,4-cyclohexanediisocyanate (CDI), hexamethylene diisocyanate (HDI), isophorone diisocyanate (IPDI), and mixtures thereof.

3. The composition according to claim 1, wherein the chain extender is selected from the group consisting of ethylene glycol, diethylene glycol, butylene glycol, propylene glycol, dipropylene glycol, 1,2-propoylene glycol, 1,3-propylene glycol, 1,4-butylene glycol, 1,3-butylene glycol, 1,5-pentamethylene glycol, 1,6-hexamethylene glycol, neopentyl glycol, 2-methyl-1,3-propanediol, 3-methyl-1,5-pentanediol, 1,4-cyclohexanedimethanol, hydroquinone di(hydroxyethyl) ether, and mixtures thereof.

4. The composition according to claim 1, wherein the soft segment comprises an isocyanate-reactive compound.

5. The composition according to claim 4, wherein the isocyanate-reactive compound comprises a polyether polyol containing compound.

6. The composition according to claim 5, wherein the polyether polyol containing compound is selected from the group consisting of poly(tetramethylene ether glycol) (PTMEG), polyethylene glycol), polypropylene glycol), and mixtures thereof.

7. The composition according to claim 1, wherein the plasticizer is selected from the group consisting of propylene carbonate, ethylene carbonate, methyl ethyl carbonate, dibutyl carbonate, triglyme, tetraglyme, y-butyrolactone, sulfolane, and mixtures thereof.

8. The composition according to claim 1, wherein the ion conductive salt is present in dissociated form and contains ions selected from the group consisting of $Li^+$, $Na^+$, $K^+$, $Cl^-$; $ClO_4^-$; $BF_4^-$, $PF_6^-$; $CF_3SO_3^-$; $N(CF_3SO_2)^{2-}$, and mixtures thereof.

9. The composition according to claim 1, wherein the plasticizer is present in an amount comprised between 5 and 40 wt % based on the total weight of the composition.

10. The composition according to claim 1, wherein the composition has a Tg lower than −30° C. as measured according to ASTM D5026.

11. The composition according to claim 1, wherein the composition has a tensile strength between 5 and 25 MPa as measured according to ASTM D412.

12. A method for making a TPU-based polymeric electrolyte composition comprising an ion conductive salt which when made into a film has a peel strength to glass comprising between 3-25 N/mm as measured according to ASTM D 3167, wherein the method comprises:

mixing an aliphatic isocyanate-reactive compound with a chain extender to form a mixture, wherein a molar ratio between the aliphatic isocyanate-containing compound and the chain extender is from 1 to 1.5;

dissolving an ion conductive salt in a plasticizer to form a plasticizer loaded with the salt;

mixing the plasticizer loaded with the salt with the mixture to form an isocyanate-reactive mixture; and adding the isocyanate-reactive mixture to an isocyanate-containing compound and forming the TPU-based polymeric electrolyte composition.

13. The method according to claim 12, wherein the aliphatic isocyanate-containing compound selected from the list consisting of 4,4'-methylene dicyclohexyl diisocyanate (H12MDI), isocyanatomethyl-1,8-octane diisocyanate, 1,4-cyclohexanediisocyanate (CDI), hexamethylene diisocyanate (HDI), isophorone diisocyanate (IPDI) and mixtures thereof.

14. The method according to claim 12, wherein the process further comprises extruding or solution casting the composition into the film.

15. The method according to claim 12, wherein the process further comprises curing the composition and then processing the cured composition into granules.

16. The method according to claim 15, wherein the granules are extruded into the film.

17. A granule made from the composition according to claim 1.

* * * * *